(12) United States Patent
Longobardo et al.

(10) Patent No.: US 7,082,260 B2
(45) Date of Patent: Jul. 25, 2006

(54) APPARATUS AND METHOD FOR BENDING AND/OR TEMPERING GLASS

(75) Inventors: Anthony V. Longobardo, Howell, MI (US); George Neuman, Ann Arbor, MI (US); Daniel F. Prone, Trenton, MI (US); Andre Heyen, Bertrange (LU)

(73) Assignees: Guardian Industries Corp., Auburn Hills, MI (US); Centre Luxembourgeois de Recherches pour le Verre et la Ceramique S.A. (C.R.V.C.), Grand Duche de Luxembourg ( * ) Notice: Subject to any disclaimer, the term of this patent is extended or adjusted under 35 U.S.C. 154(b) by 0 days.

(21) Appl. No.: 11/210,670

(22) Filed: Aug. 25, 2005

(65) Prior Publication Data

US 2005/0275924 A1 Dec. 15, 2005

Related U.S. Application Data

(60) Division of application No. 10/245,719, filed on Sep. 18, 2002, now Pat. No. 6,983,104, which is a continuation-in-part of application No. 10/101,516, filed on Mar. 20, 2002.

(51) Int. Cl.
*C03B 27/12* (2006.01)
*C03B 23/23* (2006.01)

(52) U.S. Cl. ............... 392/408; 219/388; 219/411; 65/103; 65/114; 65/104

(58) Field of Classification Search ................. None
See application file for complete search history.

(56) References Cited

U.S. PATENT DOCUMENTS

| | | | |
|---|---|---|---|
| 2,924,695 A * | 2/1960 | Atkeson ............ 219/411 |
| 3,260,584 A * | 7/1966 | Badger ............. 65/103 |
| 3,620,706 A * | 11/1971 | Spanoudis ........... 65/104 |
| 4,017,967 A | 4/1977 | Wells et al. |
| 4,336,412 A | 6/1982 | Thomander |
| 4,364,766 A | 12/1982 | Nitschke |
| 4,376,245 A | 3/1983 | Lindskog et al. |
| 4,474,831 A | 10/1984 | Downey |

(Continued)

FOREIGN PATENT DOCUMENTS

DE 299 05 385 8/2000

(Continued)

OTHER PUBLICATIONS

"Measurements of Total and Spectral Emissivities of Some Ceramic Fibre Insulation Materials", Jackson et al., pp. 1-16.

(Continued)

*Primary Examiner*—Joseph Pelham
(74) *Attorney, Agent, or Firm*—Nixon & Vanderhye P.C.

(57) ABSTRACT

An apparatus and method for bending and/or tempering glass substrate(s) are provided. The amount of near-IR radiation which reaches the glass to be bent and/or tempered is limited (e.g., via filtering or any other suitable technique). Thus, the IR radiation (used for heating the glass) which reaches the glass to be bent and/or tempered includes mostly mid-IR and/or far-IR radiation, and not much near-IR. In such a manner, coating(s) provided on the glass can be protected and kept at lower temperatures so as to be less likely to be damaged during the bending and/or tempering process. Heating efficiency can be improved. A ceramic (e.g., aluminosilicate) filter or baffle may be used in certain embodiments in order to reduce the amount of mid-IR and/or far-IR radiation reaching the glass to be tempered and/or bent.

13 Claims, 11 Drawing Sheets

U.S. PATENT DOCUMENTS

| | | | |
|---|---|---|---|
| 4,547,650 A | 10/1985 | Arditty et al. |
| 4,602,238 A | 7/1986 | Furtek |
| 4,778,507 A | 10/1988 | Aruga et al. |
| 4,882,852 A | 11/1989 | Kautto |
| 4,898,790 A | 2/1990 | Finley |
| 4,975,563 A | 12/1990 | Roebuck et al. |
| 4,986,842 A | 1/1991 | Peltonen |
| 5,059,233 A | 10/1991 | Miihkinen et al. |
| 5,176,733 A | 1/1993 | Koss |
| 5,229,194 A | 7/1993 | Lingle et al. |
| 5,233,464 A | 8/1993 | Costich |
| 5,278,939 A | 1/1994 | Boes et al. |
| 5,298,048 A | 3/1994 | Lingle et al. |
| 5,302,449 A | 4/1994 | Eby et al. |
| 5,383,990 A | 1/1995 | Tsuji |
| 5,443,669 A | 8/1995 | Tunker |
| 5,472,720 A | 12/1995 | Rakhimov et al. |
| 5,473,141 A | 12/1995 | Makris et al. |
| 5,543,628 A | 8/1996 | Chow et al. |
| 5,557,462 A | 9/1996 | Hartig et al. |
| 5,607,609 A | 3/1997 | Sakuyama et al. |
| 5,708,408 A | 1/1998 | Sundberg |
| 5,864,144 A | 1/1999 | Laine |
| 5,915,072 A | 6/1999 | Campbell et al. |
| 5,946,341 A | 8/1999 | Bizzarri |
| 5,948,538 A | 9/1999 | Brochot et al. |
| 5,966,204 A | 10/1999 | Abe |
| 5,986,244 A | 11/1999 | Jonsson et al. |
| 6,009,726 A | 1/2000 | Funk |
| 6,045,896 A | 4/2000 | Boire et al. |
| 6,056,434 A | 5/2000 | Champetier |
| 6,072,821 A | 6/2000 | Axelsson |
| 6,125,134 A | 9/2000 | Jonsson et al. |
| 6,158,247 A | 12/2000 | Didelot |
| 6,160,957 A | 12/2000 | Johansson |
| 6,172,336 B1 | 1/2001 | Vehmas |
| 6,240,746 B1 | 6/2001 | Maeda et al. |
| 6,252,220 B1 | 6/2001 | Jedlicka et al. |
| D449,375 S | 10/2001 | Andersson et al. |
| 6,297,511 B1 | 10/2001 | Syllaios et al. |
| 6,308,008 B1 | 10/2001 | Johansson et al. |
| 6,318,125 B1 | 11/2001 | Diederen et al. |
| 6,321,570 B1 | 11/2001 | De Vries, Jr. et al. |
| D452,561 S | 12/2001 | Andersson et al. |
| 6,408,649 B1 | 6/2002 | Sklyarevich et al. |
| 6,542,292 B1 | 4/2003 | Onomichi et al. |
| 6,776,008 B1 | 8/2004 | Vehmas et al. |
| 2002/0062662 A1 | 5/2002 | Fotheringham et al. |
| 2003/0177791 A1 | 9/2003 | Neuman et al. |
| 2003/0177792 A1 | 9/2003 | Longobardo et al. |
| 2003/0229131 A1 | 12/2003 | Sessler et al. |

FOREIGN PATENT DOCUMENTS

| | | |
|---|---|---|
| DE | 199 38 808 | 9/2000 |
| DE | 100 29 522 | 1/2002 |
| FR | 2 606 866 | 5/1988 |
| JP | 2001-155637 | 6/2001 |
| WO | WO 99/53237 | 10/1999 |
| WO | WO 02/04375 | 1/2002 |
| WO | WO 03/080521 | 10/2003 |

OTHER PUBLICATIONS

"The Radiant Emissivity of Some Materials at High Temperatures—Review", Hampartsoumian et al., pp. 91-99 (2001).

Investigation, Comparison and Improvement of Technical Infrared Radiators, Leupin et al., pp. 199-258 (1990).

"Radiant Heating With Infrared", Technical Guide to Understanding and Applying Infrared Heaters (1997).

International Search Report dated Dec. 29, 2003.

* cited by examiner

Radiant absorption of clear glass over an extended wavelength range.

APPARATUS AND METHOD FOR BENDING AND/OR TEMPERING GLASS

This application is a divisional of application Ser. No. 10/245,719, filed Sep. 18, 2002 now U.S. Pat. No. 6,983,104, which is a continuation-in-part (CIP) of U.S. patent application Ser. No. 10/101,516, filed Mar. 20, 2002, the entire contents of which are hereby incorporated herein by reference in this application.

This invention relates to an apparatus and method for heat bending and/or tempering glass sheets. More particularly, this invention relates to an apparatus and method for bending and/or tempering glass sheets by directing infrared (IR) radiation at the glass sheet(s) in order to heat the same, wherein the IR radiation is filtered or otherwise adjusted so as to have more radiation in the mid-IR and/or far-IR ranges than in the near IR-range.

BACKGROUND AND SUMMARY OF THE INVENTION

Devices and methods for heat bending glass sheets are well known in the art. For example, see U.S. Pat. Nos. 5,383,990; 6,240,746; 6,321,570; 6,318,125; 6,158,247; 6,009,726; 4,364,766; and 5,443,669.

FIG. 1 is a schematic diagram illustrating a conventional apparatus and method for heat bending glass sheets in making a laminated product such as a vehicle windshield. Vehicle windshields are typically curved, and thus require first and second curved (as a result of heat bending) glass sheets laminated to one another via a polymer interlayer. First glass substrate 1 has a multi-layer solar control coating 3 thereon (e.g., low-E coating including at least one IR reflecting layer of a material such as Ag); while second glass substrate 5 is not coated.

Referring to FIG. 1, two flat glass substrates 1, 5 are placed in a bending furnace (e.g., on a bending mold) in an overlapping manner by interposing an optional lubricating powder (not shown) such as sodium hydrogen carbonate, cerite, magnesium oxide, silica, or the like between contacting surfaces of the two glass substrates. The glass substrates 1, 5 are then heated using infrared (IR) emitting heating elements 7 to a processing temperature(s) near a softening point of the glass (e.g., from about 550 to 850 degrees C., more preferably from about 580 to 750 degrees C.) in order to soften the overlapping glass substrates 1, 5. Upon softening, the glass substrates 1, 5 (including any solar control coating 3 thereon) are bent by their deadweight (i.e., sagging) along a shaping surface of a bending mold (not shown) into the desired curved shape appropriate for the vehicle windshield being made. A press bending apparatus may optionally be used after the glass is sufficiently softened (the press bending may be conducted as the final step before cooling the glass).

After being heat bent in such a manner, the bent glass substrates 1, 5 (with solar control coating 3 still on substrate 1) are separated from one another and a polymer inclusive interlayer sheet (e.g., PVB) is interposed therebetween. The glass substrates 1, 5 are then laminated to one another via the polymer inclusive interlayer 9 in order to form the resulting vehicle windshield shown in FIG. 2.

Different vehicle windshield models require different shapes. Some shapes require more extensive bending than others. As windshields requiring extensive bending are becoming more popular, the need for high performance solar control coatings (e.g., including one or more IR reflecting Ag layers) has also increased. An example high performance solar control coating 3 is disclosed in WO 02/04375 (and thus counterpart U.S. Ser. No. 09/794,224, filed Feb. 28, 2001), both hereby incorporated herein by reference.

Unfortunately, it has been found that when using conventional glass bending techniques, certain solar control coatings cannot on a regular basis withstand the bending process (es) sometimes used. Set forth below is an explanation as to why certain solar control coatings have a hard time withstanding conventional heat bending processes without suffering undesirable damage such as reduced transmission.

Conventional glass bending heating elements emit IR radiation 8 in the near, mid and far IR ranges. By this we mean that heating elements 7 emit each of near-IR (e.g., 700–4,000 nm; or 0.7 to 4.0 µm), mid-IR (4,000–8,000 nm; or 4–8 µm), and far-IR (>8,000 nm; or >8 µm) radiation. In certain instances, the near-IR range may be considered from 0.7 to 3.0 µm and the mid-IR range from 3–8 µm. Herein, IR radiation is defined as wavelengths of 0.7 µm and above with known constraints.

Each of these different types (i.e., wavelengths) of IR radiation impinges upon the glass substrates 1, 5 to be heated and bent. Certain IR radiant heaters work in a manner such that turning up the power for the same results in significantly more near-IR radiation being emitted. In any event, much of the IR radiation from conventional heaters that reaches the glass to be bent is in the near-IR range, as the peak of this IR radiation is often in the near-IR range. In certain example instances, at least about 50% of the IR radiation that reaches the glass to be bent is in the near-IR range, sometimes 70% or higher. For instance, a heater with black body properties operating at 538 degrees C. emits 32.8% of its energy from 0.7 to 4 µm, 44.7% from 4 to 8 µm and 22.5% in wavelengths greater than 8 µm A heater with black body properties operating at 871 degrees C. emits 57.6% of its energy from 0.7 to 4 µm, 31.9% from 4 to 8 µm and 10.5% in wavelengths greater than 8 µm. A heater with black body properties operating at 1,094 degrees C. emits 68.7% of its energy from 0.7 to 4 µm, 24.4% from 4 to 8 µm and 6.9% in wavelengths greater than 8 µm. The total power emitted increases with temperature proportional to the absolute temperature raised to the fourth power. For the three temperatures listed above, the total emitted power is approximately 15, 63 and 125 watts/inch square, respectively. The power for 0.7 to 4 µm is 4.9, 36.3, and 85.9 watts/inch square, respectively.

U.S. Pat. No. 6,160,957 discloses a heating element including a resistor element mounted on a ceramic fiber material such as aluminosilicate in spaced relation thereto. However, in the '957 Patent it is the resistor element (not the ceramic fiber) which emits the IR radiation toward the product to be heated.

As shown in FIG. 3, it has been found that typical soda lime silica glass (often used for substrates 1, 5) has a high absorption of IR radiation in the mid-IR and far-IR ranges. In other words, soda lime silica glass absorbs much of incident IR radiation at wavelengths above about 3–4 µm (microns). Thus, in the mid and far-IR ranges, the glass absorbs much of the IR radiation before it can reach the coating. It is believed that this absorption in the mid and far-IR ranges is due to at least water, Si—O and Si—O—H absorption in the glass matrix. FIG. 3 shows that soda lime silica glass is substantially opaque to IR radiation above 3–4 µm, but rather transmissive of IR radiation below 3–4 µm. Unfortunately, the transmissive nature of the glass at wavelengths less than 3–4 µm means that a significant amount of IR radiation in the near-IR range (from 0.7 to 3–4 µm) is not absorbed by the glass substrate(s) 1 and/or 5 and as a result passes therethrough and reaches solar control coating 3. As used herein, the phrase "from 0.7 to 3–4 µm" means from 0.7 µm to 3 and/or 4 µm. The amount of energy in this wavelength band (watts/inch$^2$) increases as the temperature of the elements increases. Typically, the power applied in later times in the bending process is substantially higher than earlier times so that the amount of energy not absorbed by the glass and thus by the coating increases as the bending process proceeds.

Unfortunately, certain of this near-IR radiation which is not absorbed by the glass substrate and thus reaches solar control coating 3, is absorbed by the coating 3 (e.g., by Ag layer(s) of the coating) thereby causing the coating 3 to heat up. This problem (significant heating of the coating) is compounded by: (a) certain solar control coatings 3 have a room temperature absorption peak (e.g., of 20–30% or more) at wavelengths of approximately 1 µm in the near IR range, at which wavelengths the underlying glass is substantially transmissive, and (b) the absorption of many solar control coatings 3 increases with a rise in temperature thereof (e.g., sheet resistance Rs of Ag layer(s) increase along with rises in temperature). In view of (a) and (b) above, it can be seen that the peak absorption of certain solar control coatings 3 at near-IR wavelengths of about 1 µm can increase from the 20–30% range to the 40–60% range or higher when the coating temperature increases from room temperature to 500 degrees C. or higher, thereby enabling the coating to heat up very quickly when exposed to significant amounts of near-IR wavelengths. The temperature of the coating may be mitigated by conduction of the absorbed energy into the bulk glass, but the rate of this process is finite. If energy is applied to the coating faster than it can be dissipated into the bulk, a thermal gradient is created leading to substantial overheating of the coating which leads to coating damage. The potential for coating overheating is often highest in the later stages of the bending process when the glass and coating are near the softening point, e.g., due to the higher amounts of near-IR heat being generated by the heating element(s) and due to absorption of the coating being higher.

Coating 3 is more susceptible to being damaged when it is unnecessarily heated up during the glass bending process. When coating 3 is damaged (e.g., visible transmittance drops significantly), the bent glass substrate 1 with the damaged coating thereon is typically discarded and cannot be commercially used.

This problem (i.e., coating overheating) also affects the shapes that can be attained in the bending process. If heat is applied only from one side (e.g., from the top in FIG. 1), the presence of the coating on substrate 1 versus substrate 5 limits the radiant energy that can be absorbed by the substrate 5; so the substrate 1 may become more soft than substrate 5. This means that substrate 1 must often be overheated in order to enable substrate 5 to reach a desired temperature for sagging to a desired shape. Application of heat to both the top and bottom (see FIG. 1) provides radiant heat directly to both substrates, but also causes the coating to receive double the amount of energy potentially leading to overheating.

It can be seen that certain solar control coatings 3 have a narrow thermal stability range that can limit the shape (i.e., degree of bending) of glass attainable in a bending process. Highly bent windshields often require higher bending temperatures and/or long bending times which certain coatings 3 cannot withstand given conventional glass bending techniques.

An object of this invention is to minimize the time at and/or peak temperature attained by a solar control coating 3 during a heat bending process for bending and/or tempering a glass substrate that supports the coating.

Another object of this invention is to provide an apparatus and/or method for heat bending and/or tempering glass substrates/sheets, designed to reduce the amount of near-IR radiation that reaches the glass substrate(s) to be bent.

Another object of this invention is to provide a filter (or baffle) for filtering out at least some near-IR radiation before it reaches a glass substrate to be bent and/or tempered. This can enable a solar control coating supported by the glass substrate to reach a lesser temperature than if the filter was not provided.

By enabling the maximum coating temperature to be reduced (and/or the time at which the coating is at a maximum temperature to be lessened), certain embodiments of this invention can realize one or more of the following advantages: (a) the solar control coating is less likely to be damaged during the bending and/or tempering process of an underlying glass substrate, (b) higher degrees of bending of an underlying glass substrate can be achieved without damaging the solar control coating; (c) heating time and/or maximum coating temperature can be reduced without reducing the amount of glass bend, and/or (d) power consumption of the heater may be reduced in certain instances.

In certain example embodiments of this invention, a filter (e.g., baffle or the like) of or including a ceramic (e.g., a silicate such as aluminosilicate) is used which reduces the amount near-IR radiation which reaches the glass substrate and/or coating to be bent and/or tempered.

Another object of this invention is to fulfill one or more of the above-listed objects.

In certain example embodiments of this invention, one or more of the above-listed objects is/are fulfilled by providing an apparatus for bending and/or tempering a glass substrate, the apparatus comprising: a heating element for generating energy; and a near-IR filter comprising a ceramic radiating surface located between the heating element and the glass substrate, the near-IR filter for reducing the amount of near-IR radiation that reaches the glass substrate to be bent and/or tempered.

In other example embodiments of this invention, one or more of the above-listed objects is/are fulfilled by providing a method of bending glass, the method comprising: providing a glass substrate having a solar control coating thereon; directing IR radiation at the glass substrate from a heating layer comprising ceramic in order to heat the glass substrate to a temperature of at least about 550 degrees C. for bending; and wherein less than about 30% of the IR radiation reaching the glass substrate is at wavelengths from 0.7 to 3.0 µm.

DETAILED DESCRIPTION OF EXAMPLE EMBODIMENTS OF THE INVENTION

Figure 1:
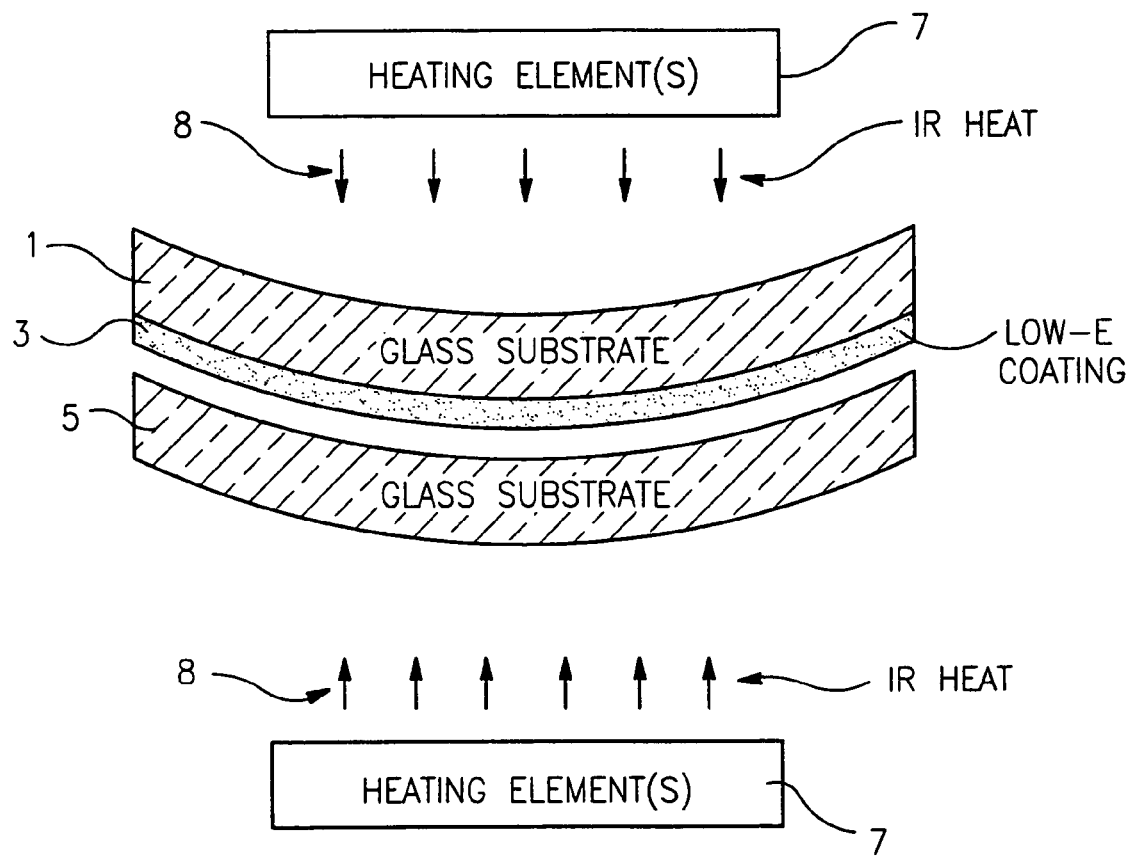
FIG. 1 is a schematic diagram of a conventional apparatus and method for bending glass sheets.

Referring now more particularly to the accompanying drawings in which like reference numerals refer to like parts throughout the several views.

Figure 4:
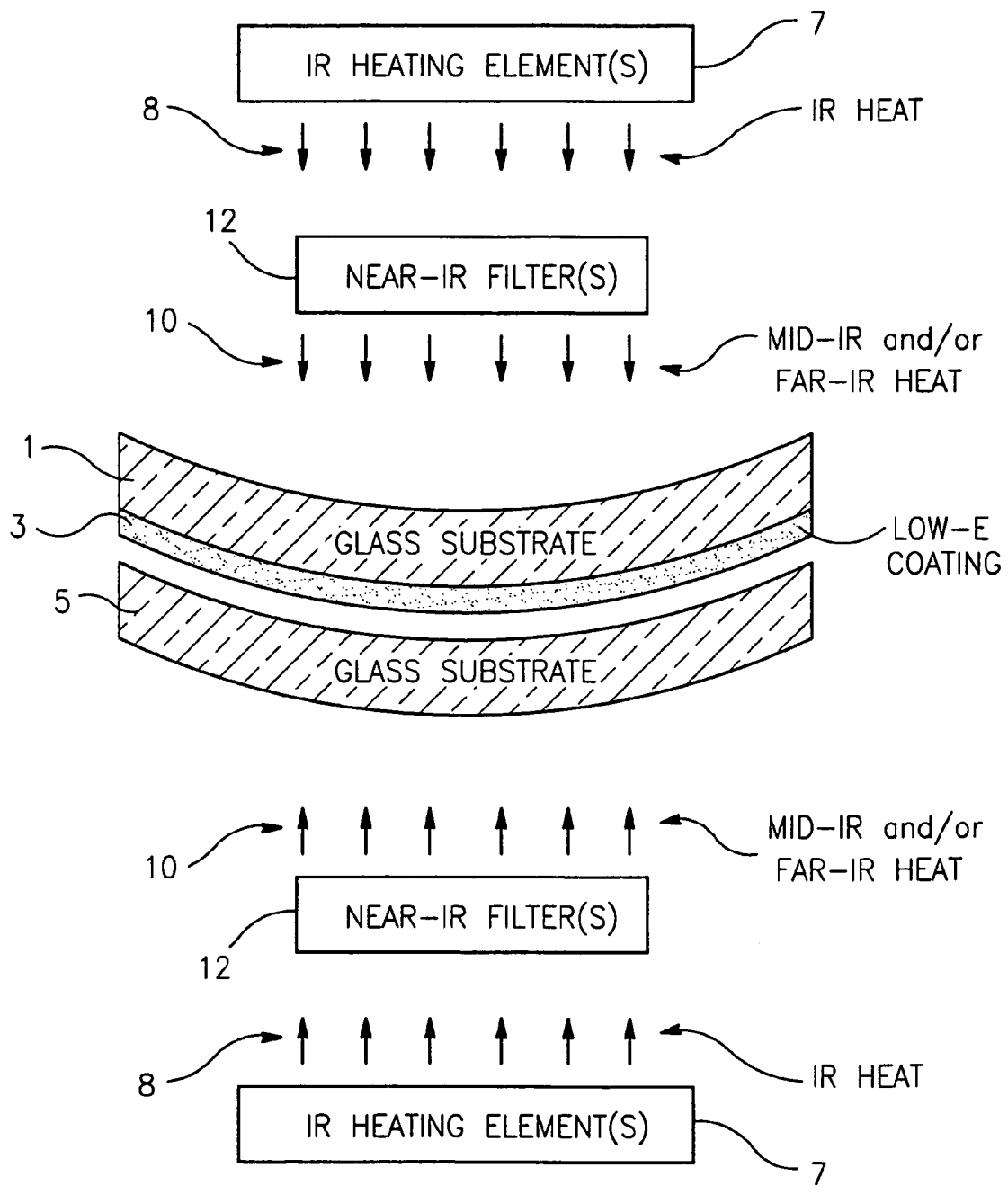
FIG. 4 is a schematic diagram illustrating an apparatus and method for bending and/or tempering glass substrate(s)/sheet(s) according to an example embodiment of this invention.

FIG. 4 is a schematic diagram of an apparatus and method for bending and/or tempering glass substrates/sheets according to an example embodiment of this invention. Glass sheets or substrates bent and/or tempered herein may be used in applications such as vehicle windshields, other types of laminated or monolithic windows, IG window units, or any other suitable application.

Referring to FIG. 4, first and second approximately flat glass substrates 1 and 5 are provided. First glass substrate 1 may have a multi-layer solar control coating 3 thereon (e.g., a low-E coating including at least one IR reflecting layer of a material such as Ag, NiCr, Au or the like). Second glass substrate 5 may or may not be coated in a similar manner. Coating 3 is provided on the side of substrate 1 closest to the other substrate 5 in order to having the coating 3 between lites after lamination. The glass substrates 1, 5 may be of or include soda lime silica glass, or any other suitable type of glass.

Example solar control coatings 3 are disclosed in U.S. Ser. No. 09/794,224 filed Feb. 28, 2001 (see WO 02/04375), and in U.S. Pat. Nos. 5,229,194; 5,298,048; 5,557,462; 3,682,528; 4,898,790; 5,302,449; 6,045,896; and 5,948,538, all hereby incorporated herein by reference. While these are examples of solar control coatings 3 which may be used, this invention is not so limited as any other suitable solar control coating may instead be used. In certain embodiments of this invention, solar control coating 3 includes at least one IR reflecting layer (e.g. Ag, Au or NiCr) sandwiched between at least first and second dielectric layers. In certain embodiments, the solar control coating 3 includes first and second IR reflecting layers (e.g., of or including Ag, Au or the like), and a first dielectric layer (e.g., of or including silicon nitride, silicon oxide, titanium oxide or the like) provided between the underlying glass substrate 1 and the first IR reflecting layer, a second dielectric layer provided between the two IR reflecting layers, and a third dielectric layer provided over both IR reflecting layers (e.g., see WO 02/04375 and Ser. No. 09/794,224). In certain embodiments of this invention, coating 3 may be deposited onto glass substrate 1 in any suitable manner (e.g., via sputtering as described in any of the aforesaid patents/patent applications).

Figure 5:
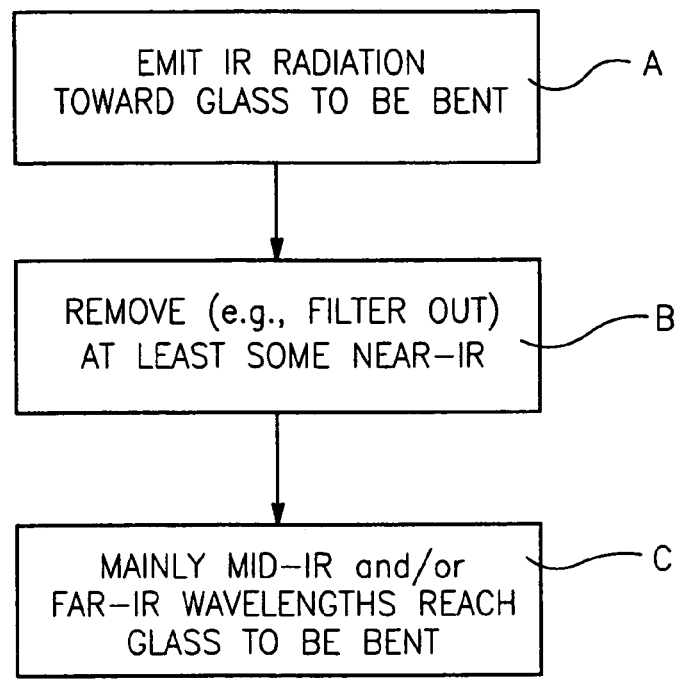
FIG. 5 is a flowchart illustrating certain steps taken in bending glass substrate(s)/sheet(s) according to an example embodiment of this invention.

Referring to FIGS. 4–5 for example bending embodiments, approximately flat glass substrates 1 (with coating 3 thereon) and 5 may be placed in a bending furnace in an overlapping manner by interposing an optional lubricating powder (not shown) such as sodium hydrogen carbonate, cerite, magnesium oxide, silica, or the like between contacting surfaces of the two glass substrates. Coating 3 is between the substrates, and supported by substrate 1 and/or 5. Heating elements 7 (e.g., above and/or below the glass substrates 1, 5) emit IR radiation 8 toward the glass substrates 1, 5 in order to heat the same for purposes of bending (see step A in FIG. 5). In certain embodiments of this invention, heating elements 7 emit IR radiation 8 in each of the near-IR, mid-IR and far-IR ranges; although in other embodiments the heating elements 7 need not emit radiation in the mid or far-IR range. Near IR filter(s) 12 filter out at least some of the near-IR rays (e.g., at some rays from 0.7 to 3–4 μm) from the radiation before the radiation reaches the glass substrates 1, 5 (see step B in FIG. 5). Thus, the radiation 10 emitted and/or transmitted from filter(s) 12 includes less near-IR radiation ( i.e., rays from 0.7 to 3–4 μm) than does the radiation 8 received by filter(s) 12. IR radiation 10 emitted and/or transmitted from filter(s) 12 may include both mid-IR and far-IR radiation in certain embodiments of this invention, but need not include mid-IR radiation in all embodiments (see step C in FIG. 5). In different embodiments of this invention, filter(s) 12 may either be an integral part of the heating element 7, or alternatively may be spaced from the heating element 7 so as to be located between the substrate to be heated and the heating element 7 as shown in FIG. 4.

In certain embodiments of this invention, near-IR filter(s) 12 filters out at least about 10% of the near-IR radiation from radiation 8, more preferably at least about 30%, even more preferably at least about 50%, and most preferably at least about 70%. In certain embodiments of this invention, the radiation 10 which reaches glass substrates 1, 5 for heating the same includes IR radiation of which less than about 50% is in the near-IR range, more preferably less than about 30%, even more preferably of which less than about 20% is in the near-IR range, still more preferably of which less than about 10% is in the near-IR range, and most preferably of which from about 0–5% is in the near-IR range.

The ratio of near-IR to far-IR emitted from heating element(s) 7 in radiation 8, for example, may be a function of heating element temperature as discussed above. As explained above, this ratio of near to far-IR emitted from heating element(s) 7 may be about 1.4 at 538 degrees C., about 5.5 at 871 degrees C. and about 10 at 1093 degrees C. In certain embodiments of this invention, the near-IR filter(s) reduces this ratio at a given temperature to less than 85%, more preferably less than 50%, and most preferably less than 35% of its original value. In certain embodiments, the filter(s) does not attenuate the mid and/or far IR radiation by more than 50% of its original value, more preferably not more than 20% of its original value. This enables a significant amount of near-IR to be filtered out, while maintaining a relatively high power output in the mid and/or far IR bands.

Because of the reduced amount of near-IR radiation reaching glass substrates 1, 5, the substrates can absorb more of the IR radiation (i.e., since the glass absorbs significant IR radiation in the mid and far-IR regions) and less IR radiation reaches coating 3. Because less IR radiation reaches coating 3, the coating 3 is not heated as much as it would have been if filter(s) 12 were not provided. Stated another way, by heating the glass substrate 1 from the non-coated side thereof using predominantly mid and/or far IR wavelengths (and less or little near-IR), the coating 3 can be kept at a lower temperature and/or the time period that the coating is at higher temperatures can be reduced. The ability to keep coating 3 at a lower temperature during bending of the underlying glass substrate 1 enables the coating 3 to be less susceptible to damage. Moreover, it will be appreciated that glass is more efficiently heated using mid-IR and/or far-IR radiation (as opposed to near-IR) since the glass absorbs and is heated by radiation in the mid and far-IR ranges. As a result, yields increase and more extreme bending can be conducted. In other words, selecting how the glass is heated by predominantly using mid-IR and/or far-IR wavelengths (i.e., wavelengths that the glass is substantially opaque to and absorbs) heats that glass in an efficient manner while simultaneously protecting the coating 3.

Figure 2:
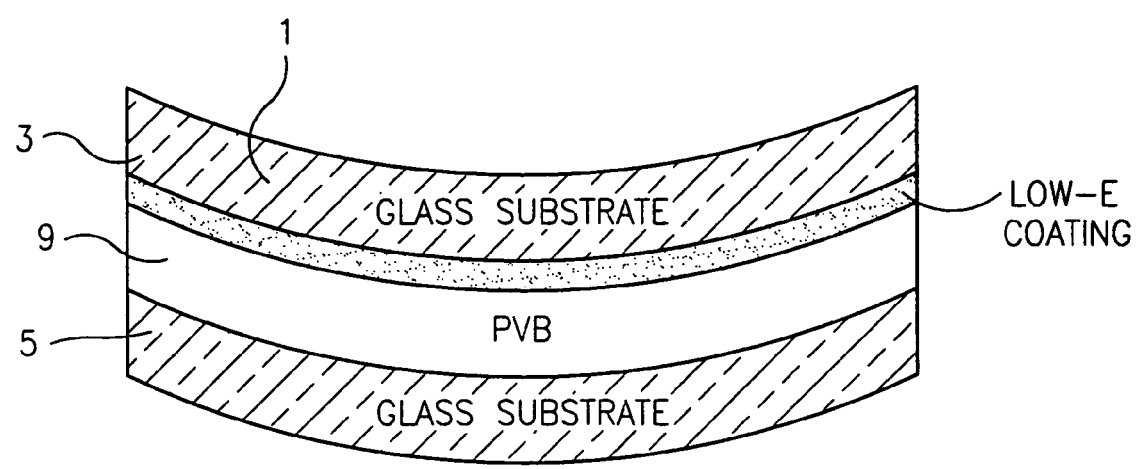
FIG. 2 is a cross sectional view of a vehicle windshield made using the apparatus and method of FIG. 1.

During the bending process, the glass substrates 1, 5 are heated to a processing temperature(s) near a softening point of the glass (e.g., from about 550 to 850 degrees C., more preferably from about 580 to 750 degrees C.) in order to soften the overlapping glass substrates 1, 5. Upon softening, the glass substrates 1, 5 (including any solar control coating 3 thereon) are bent by their deadweight (i.e., sagging) along a shaping surface of a bending mold (not shown) or other suitable structure into the desired curved shape. The glass sheets may optionally be press bent after reaching an appropriate temperature. After being heat bent in such a manner, the bent glass substrates 1, 5 (with solar control coating 3 still on substrate 1) are separated from one another and a polymer inclusive interlayer sheet 9 (e.g., of or including polyvinyl butyral (PVB) or any other suitable laminating material) is interposed therebetween. The bent glass substrates 1, 5 are then laminated to one another via the polymer inclusive interlayer 9 in order to form a vehicle windshield or any other suitable structure (e.g., see FIG. 2).

While FIG. 4 illustrates a pair of glass substrates 1, 5 being bent together at the same time, this invention is not so limited. In certain alternative embodiments, the bending apparatus may bend only one glass substrate at a time. Moreover, bending techniques and/or methods herein may be used to bend glass substrates 1, 5 regardless of whether they have coatings thereon. The techniques described herein may also be used in order to temper glass substrates (instead of or in addition to bending the glass); as the filter(s) 12 would also be useful in thermal tempering processes in order to keep the coating at as low a temperature as possible while the underlying glass is tempered.

Figure 6:
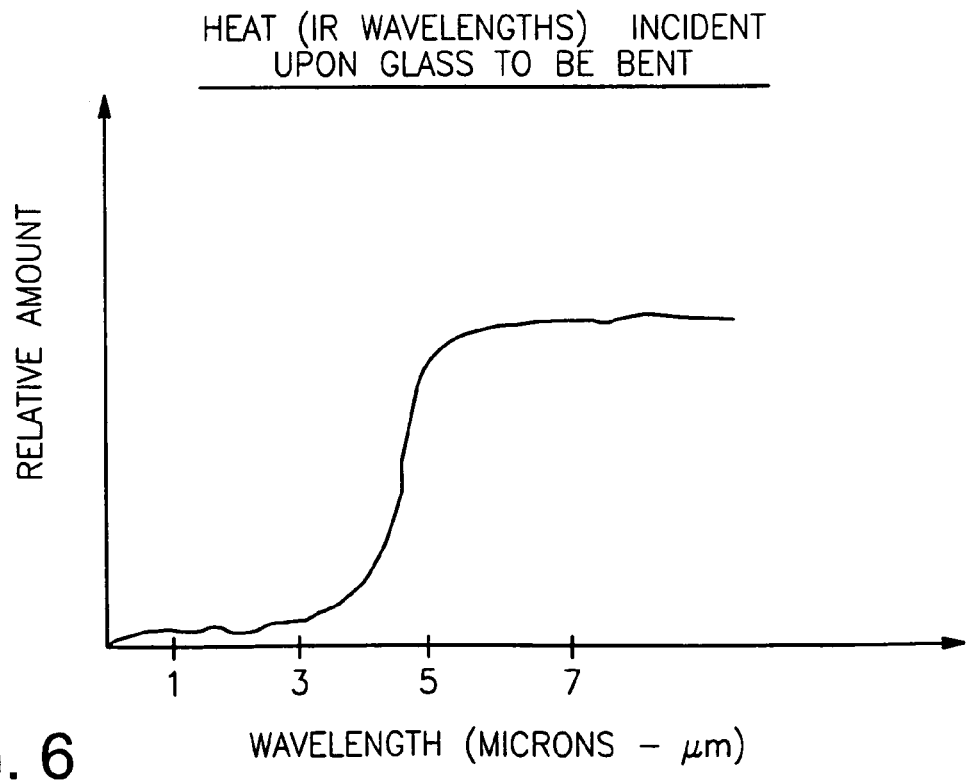
FIG. 6 is a graph (wavelength vs. relative amount) illustrating that more mid-IR and/or far-IR heating radiation, than near-IR, reaches glass substrate(s) to be heated in the FIG. 4–5 and 7 embodiments of this invention.

FIG. 6 is a graph illustrating an example spectrum of radiation 10 which reaches the glass substrates 1 and/or 5 after being filtered by filter(s) 12. As can be seen, the majority of radiation reaching the glass substrates 1 and/or 5 is in the mid-IR and far-IR ranges, with only a small amount in the near-IR range. As explained above, this enables the time and peak temperature attained by solar control coating 3 during the heat bending process to be minimized; which in turn reduces the likelihood of the coating being damaged.

Figure 7:
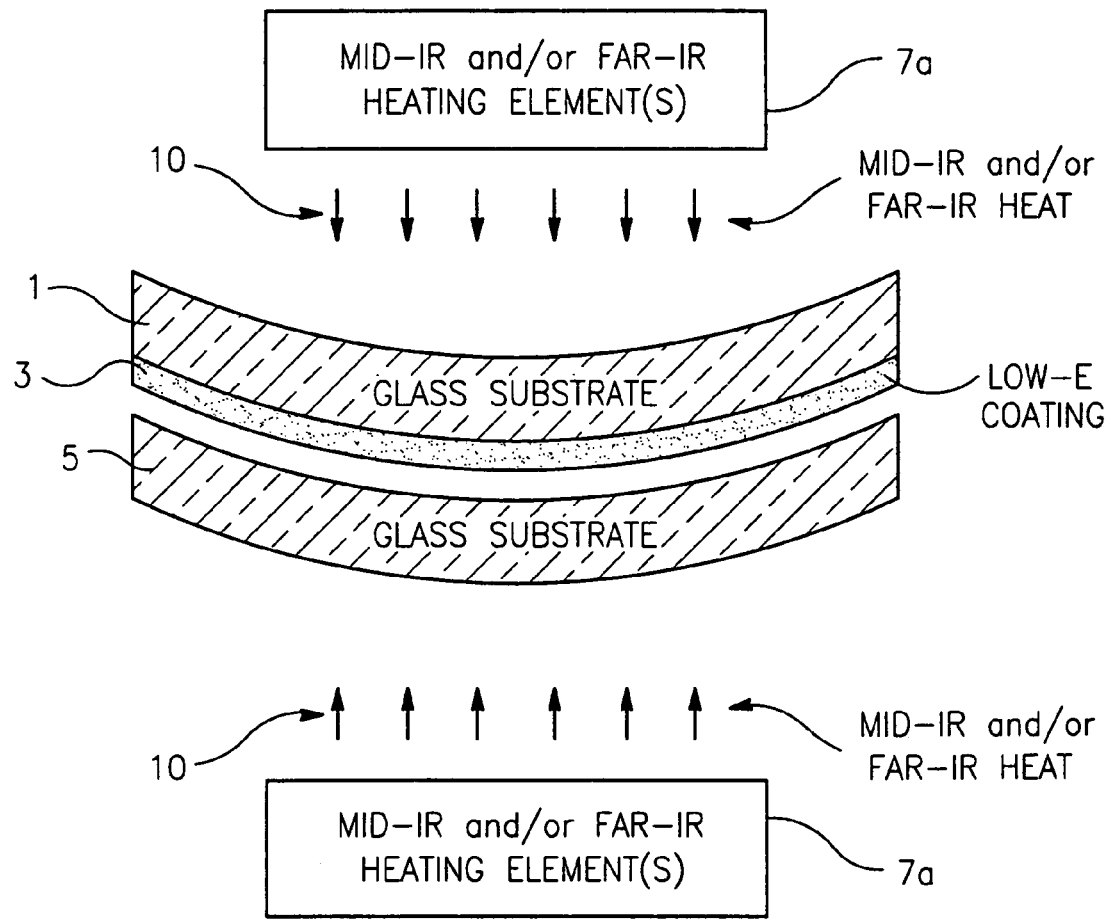
FIG. 7 is a schematic diagram illustrating an apparatus and method for bending and/or tempering glass substrate(s)/sheet(s) according to another example embodiment of this invention.

FIG. 7 is a schematic diagram of another embodiment of this invention. The FIG. 7 embodiment is similar to the embodiment of FIGS. 4–5, except that the IR heating element(s) 7a are of a type that emits primarily mid-IR and/or far-IR radiation, and not much if any near-IR radiation. FIG. 6 illustrates an example spectrum of radiation that may be emitted by IR heating element(s) 7a. The radiation 10 emitted by heating element(s) 7a in the FIG. 7 embodiment is similar to that 10 after filtering in the. FIG. 4–5 embodiment. Near-IR filter(s) 12 may or may not be used in conjunction with the FIG. 7 embodiment. The radiation emitted by the heating elements 7 may be altered by the application of an appropriate coating(s) to the heating element(s) surface in certain embodiments of this invention.

Figure 8:
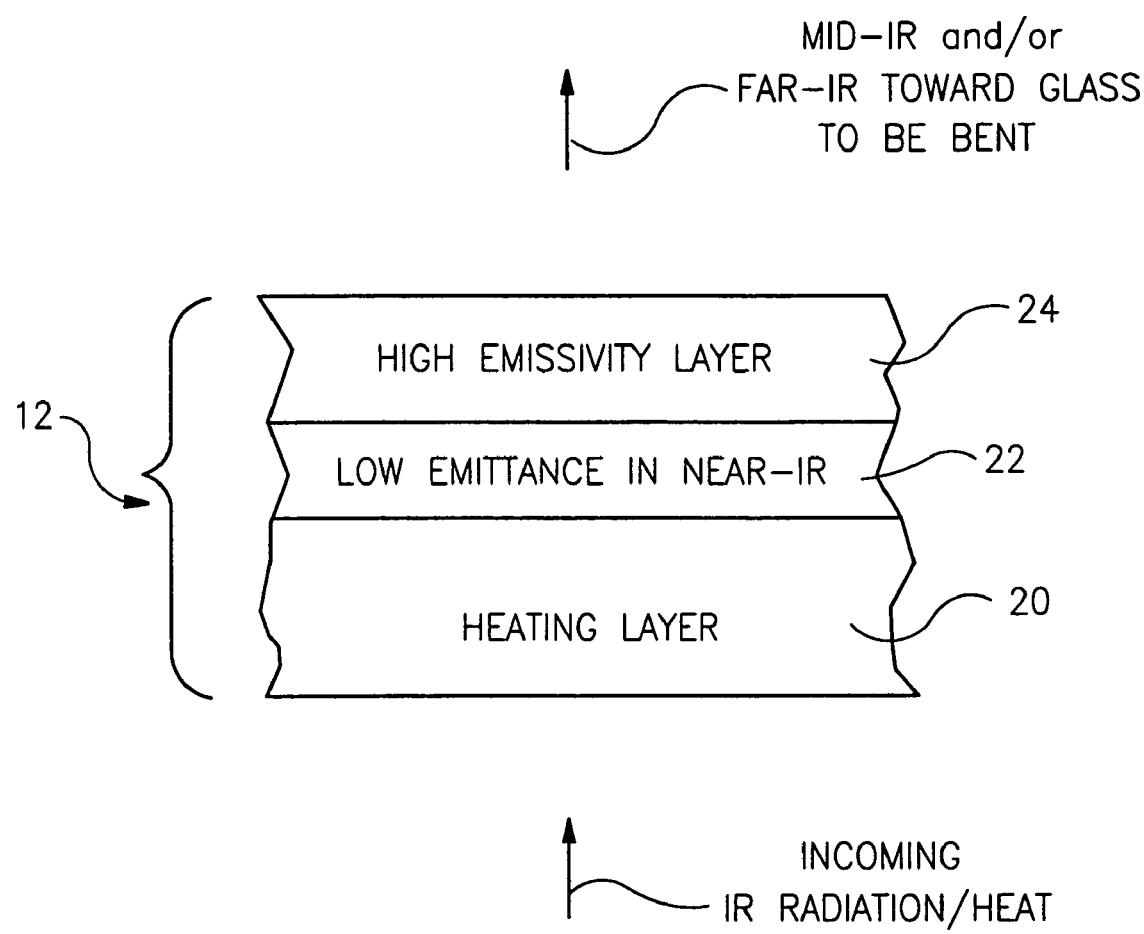
FIG. 8 is a cross sectional view of an example near-IR filter for filtering out at least some near-IR wavelengths, that may be used in the FIG. 4–5 embodiments of this invention.

FIG. 8 is a cross sectional view of an example near-IR filter 12 which may be used in any of the FIG. 4–7 embodiments of this invention. In this example, near-IR filter 12 (which filters out at least some near-IR radiation as discussed above) includes layers 20, 22 and 24. Layer 20 acts as a substrate for the other layers and also functions as a heating layer in that it receives heat (e.g., in the form of IR radiation, conduction, or the like) from a heating element and transfers the heat to layer 22 via conduction. Layer 20 may or may not contact the heating element in different embodiments of this invention. If layer 20 is not in direct contact with the heating element(s), it may include an optional layer or coating on its surface facing the heating element(s) that is a broad wavelength high emissivity coating to maximize the efficiency of capturing IR emitted from the heating element(s). For example, in the context of FIG. 4, layer 20 receives IR radiation 8 from heating element 7 and as a result thereof heats up. Layer 20 may be of or include Ni, Cu, Au, or any other suitable material capable of heating up in such a manner in different embodiments of this invention. Alternatively, layer 20 may be heated by conduction resulting from direct contact with the heating element(s). Ni is a preferred material for layer 20 in view of its high melting point and its compatibility with Au that may be used for layer 22. Layer 20 may be any suitable thickness; in example non-limiting embodiments layer 20 may be of Ni having a thickness of about ½ inch.

As heating layer 20 is heated up, it in turn heats up layer 22 (e.g., via conduction heating when layers 20 and 22 are in contact with one another). Layer 22 is chosen to be of a material that has a low emittance (low-E) in the near-IR range. In certain embodiments of this invention, layer 22 has an emissivity of no greater than about 0.5 in the near IR range, more preferably no greater than about 0.3 in the near IR range, still more preferably no greater than about 0.2 in the near IR range, and even more preferably no greater than about 0.1 in the near IR range. These example ranges in certain instances, may assume an emissivity of the unfiltered heater being from about 0.9 to 1.0. It can be seen that near-IR range radiation reaching the glass to be heated can be reduced when at a given wavelength the filter has an emissivity less than that of the heating element(s) 7. In certain embodiments of this invention, the emissivity of the total filter (e.g., layers 22, 24) is less than 80%, more preferably less than 50%, and most preferably less than 35% of the unfiltered heating element 7's emissivity. Layer 22 may be of or include Au (gold), Ag (silver), Al (aluminum), or any other suitable material in different embodiments of this invention. In certain example embodiments, layer 22 is opaque and comprises Au from about 200–20,000 Å thick. In alternative embodiments of this invention, layers 20 and 22 may be combined in a single layer of a single material (e.g., Au or any other suitable material).

High emissivity layer 24 (e.g., of or including fused silica) is heated up by layer 22 via conduction, convective, and/or radiative heating. In certain example embodiments, layer 24 may include at least about 75% $SiO_2$, more preferably at least about 80% $SiO_2$. Layer 24 may also include material such as aluminum oxide or the like. In certain embodiments, layer 24 has a rather high transparency of near-IR and a high emissivity in the mid and far IR regions; this may be achieved by a single layer or multiple layers. Some absorption can be tolerated in the near IR spectrum of layer 24. Upon being heated by layer 22, layer 24 emits IR radiation (mostly in the mid and/or far-IR regions) 10 toward the glass to be bent; layer 24 has a rather high emittance for long IR wavelengths. In certain example embodiments of this invention, layer 24 has an emissivity of at least about 0.4 at IR. wavelengths of from 5 to 8 μm, more preferably of at least about 0.45 at IR wavelengths of from 5 to 8 μm, and even as high as 0.8 or higher for some wavelengths in the range of from 5 to 8

"Emissivity" is known as the measure of a material's ability to absorb and/or emit radiation. For example, if a material has an emissivity of 0.8 (out of 1.0), it radiates 80% of the energy that a perfect radiator at the same temperature would radiate. Likewise, if a material has an emissivity of 0.1, it radiates only 10% of the energy that a perfect radiator at the same temperature would radiate. As for absorbtion, if a material reflects 20% of the electromagnetic energy striking it and absorbs the other 80%, it has an emissivity of 0.8. Likewise, if a material reflects 90% of the electromagnetic energy striking it and absorbs the other 10%, it has an emissivity of 0.1. If a material has an emissivity of 0.5, it will absorb 50% of the energy it intercepts and the other 50% will either be reflected by it or transmitted through it.

As can be seen from the above, the near-IR filter of FIG. 8 is heated by heating element(s) 7 by for example conduction or convection, and emits the energy in a different form with less near-IR radiation compared to the unfiltered radiation 8 from heating element(s) so that less near-IR radiation reaches the glass to be heated. The materials listed for filter 12 are for purposes of example, and are not intended to be limiting unless specifically claimed.

Figure 9:
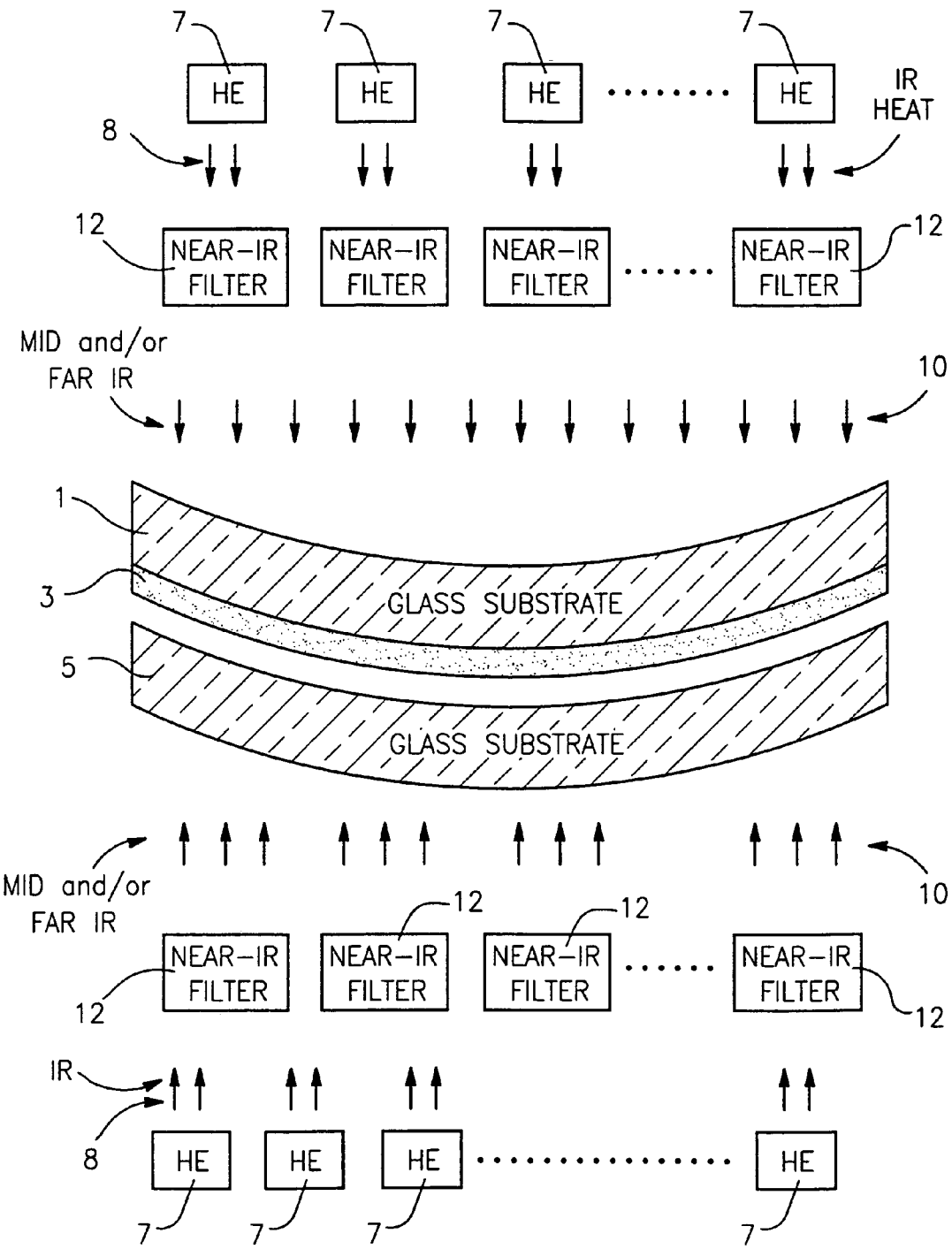
FIG. 9 is a schematic diagram illustrating an apparatus and method for bending and/or tempering glass substrate(s)/sheet(s) according to another example embodiment of this invention.

FIG. 9 illustrates another embodiment of this invention, similar to any one of those discussed above, except that a plurality of heating elements (HE) 7 and a plurality of near-IR filters 12 are provided. The filters 12 are electrically and/or thermally insulated from one another to at least some extent (e.g., by spacing the filters from one another and having air or some other thermal insulator provided between the filters). In such a manner, spatially distributed power (e.g., different heat amounts being output from different heating elements 7) can be more easily controlled, so as to prevent thermal equalization among all filters. In other words, if it is desired to heat one part of the glass (e.g., center) more than other parts of the glass (e.g., edges), then more power can be applied to the center heating elements 7. When this is done in the FIG. 9 embodiment, the filters 12 near the center of the heating area filter out more near-IR than do the filters near the glass edges, but also emit more mid and/or far IR; so that even with the presence of filters 12 the one part of the glass can still be heated more than other parts of the glass. This is advantageous when it is desired to control bending to different shapes.

The aforesaid embodiments illustrate first and second heating elements provided on the top and bottom sides, respectively, of glass to be bent. However, this invention is not so limited, as in certain embodiments of this invention only a single heating element need by provided (either above or below the glass to be bent).

Figure 10:
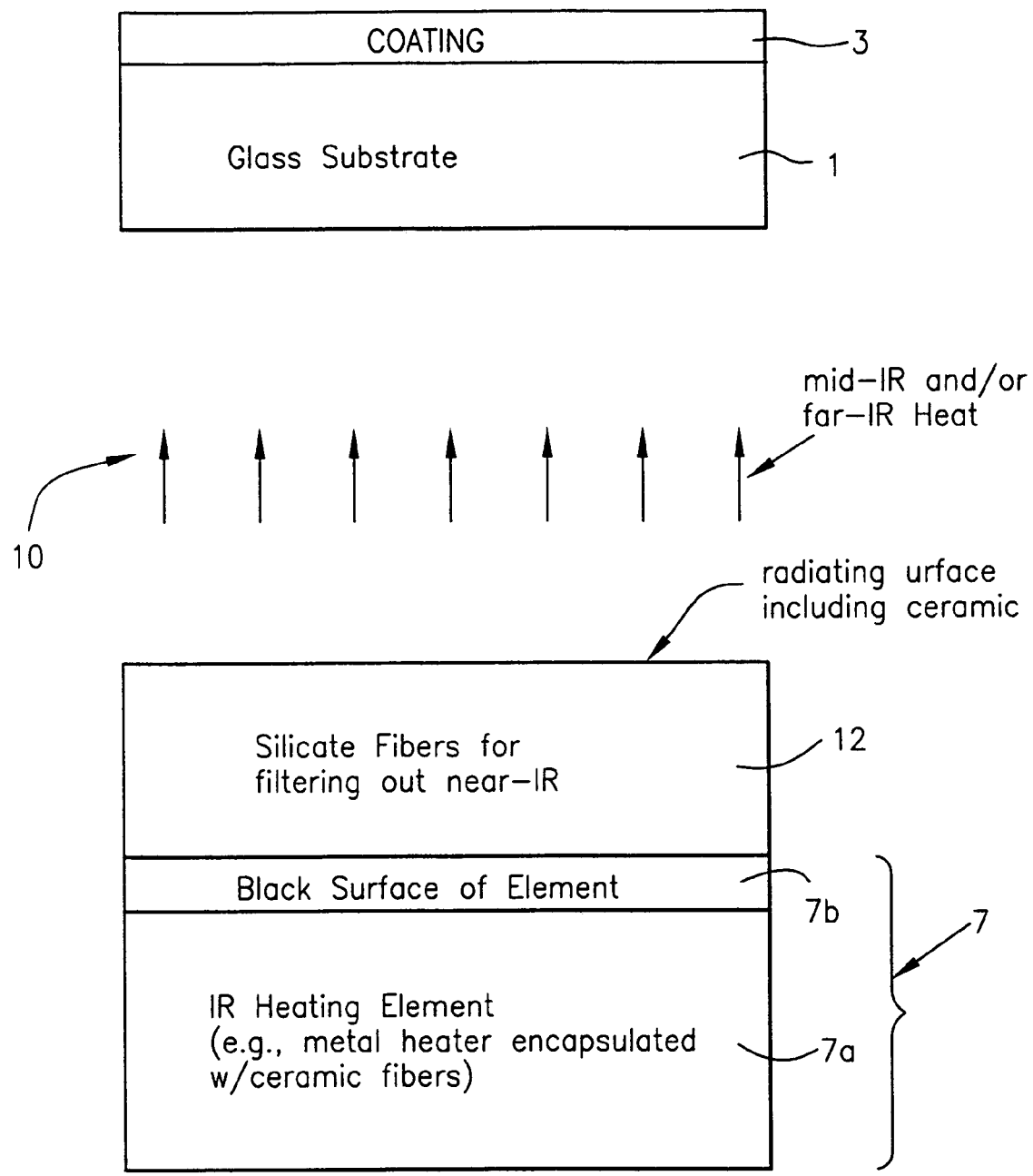
FIG. 10 is a schematic diagram illustrating a silicate inclusive filter which may be used in an apparatus and/or method for bending and/or tempering glass substrate(s)/sheet(s) according to any of the embodiments of this invention.

FIG. 10 is a cross sectional view of another example near-IR filter 12 which may be used in any of the aforesaid embodiments of this invention. In this embodiment shown in FIG. 10, filter(s) 12 may either be an integral part of the heating element 7, or alternatively may be spaced from the heating element 7 so as to be located between the substrate to be heated and the heating element 7. In either event, the filter includes a radiating surface (of or including ceramic such as ceramic fibers) that directs heating radiation toward the substrate to be bent and/or tempered. In certain embodiments, there is no other structure between the substrate to be heated and the radiating surface as shown in FIG. 10.

It is noted that the heating element 7 is certain example embodiments may include a heater (e.g., metal or metal alloy coil/wire) mounted in a material such as a ceramic 7a, coated with a black body or generally black coating 7b as is known in the art. Example heating elements 7 are provided in U.S. Pat. Nos. D452,561, 6,308,008, D449,375, 6,160, 957, 6,125,134, 5,708,408, 5,278,939, 4,975,563, 4,602,238, and 4,376,245, all incorporated herein by reference. However, any other suitable type of heating element 7 may also be used, and this invention is not limited to those listed above.

In the FIG. 10 embodiment, near-IR filter 12 (which filters out at least some near-IR radiation as discussed above) includes or is of a ceramic material (e.g., oxide ceramic) at the radiating surface thereof. In certain example embodiments, the filter 12 includes or is of a silicate such as aluminosilicate. The aluminosilicate in near-IR filter 12 may be in the form of a plurality of fibers in the form of a fiber board, or in any other suitable form including but not limited to a cloth comprising fused silicate-inclusive fibers, Fiberfrax™, non-fiber ceramic, or the like. It has been found that such a material has a very desirable emissivity (see FIG. 12) so that it does not emit much near-IR radiation. As a result, by using a filter(s) 12 of or including such material, the amount of near-IR radiation which reaches the glass and coating to be bent/tempered is reduced compared to if the ceramic inclusive filter(s) was not used.

Referring to FIG. 10, the ceramic filter 12 may be in contact with heating element 7 or alternatively be spaced from the element 7 so as to be located between the heating element 7 and the substrate 1 thereby acting as a sort of baffle as well as a filter. In either case, the ceramic (e.g., aluminosilicate) inclusive filter 12 acts as a heating layer(s) in that it receives heat (e.g., in the form of IR radiation, conduction, convection, or the like) from heating element 7 and radiates the heat in rays 10 in accordance with the example emissivity shown in FIG. 12 so as to heat up substrate 1 for bending and/or tempering. While filter 12 is shown in FIG. 10 as including only one layer, this invention is not so limited as other layer(s) may be provided in filter(s) 12.

Figure 3:
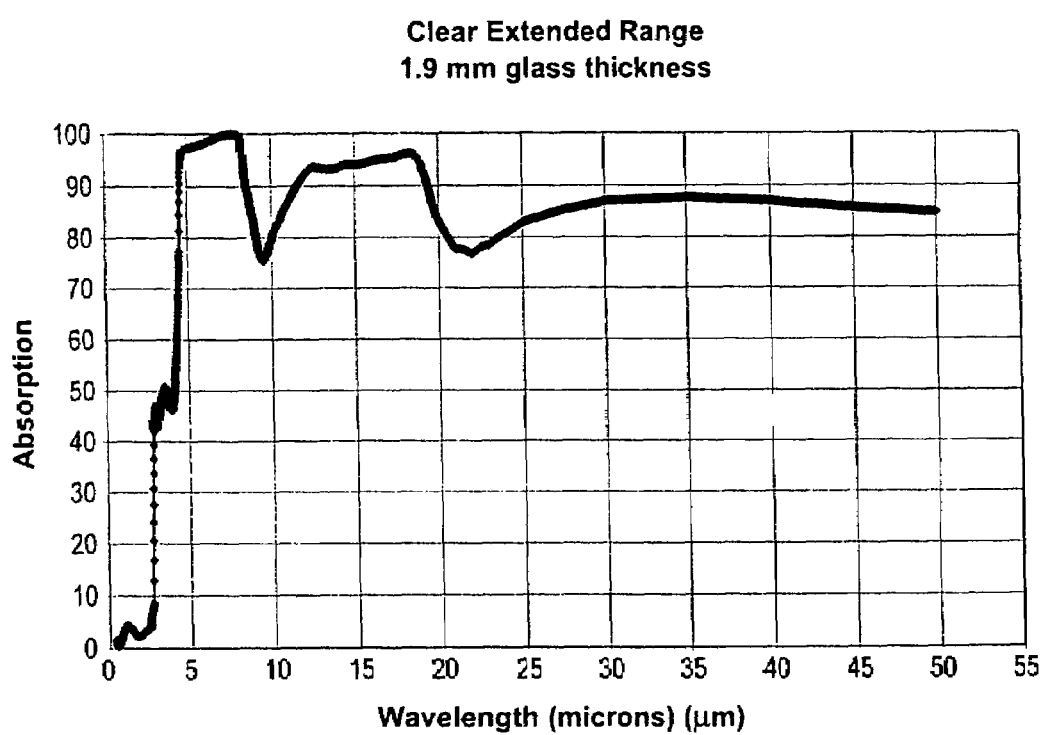
FIG. 3 is a graph (wavelength vs. absorption) illustrating the absorption of IR radiation by a piece of soda lime silica glass as a function of wavelength.

The filter(s) 12 in the FIG. 10 embodiment (located above and/or below the glass to be heated) has an emissivity (e.g., see FIG. 12) which causes little near-IR radiation to reach the glass 1 to be heated. In certain example embodiments of this invention, the emitting portion of filter(s) 12 has an emissivity of at least about 0.4 at IR wavelengths of from 5 to 8 μm, more preferably of at least about 0.45 at IR wavelengths of from 5 to 8 μm, and most preferably as high as 0.7 (or even 0.8) or higher for some wavelengths in the range of from 5 to 8 μm. Moreover, in certain example embodiments of this invention, the emitting portion of filter(s) 12 has an emissivity of less than 0.45 at all wavelengths from 0.9 to 3 μm, most preferably less than 0.35 at all wavelengths from 0.9 to 3 μm (e.g., see FIG. 12). Thus, filter 12 is of a material(s) that emits an energy spectrum that is closely coupled/related to the absorption spectra of soda lime silica glass (compare FIGS. 3 and 12). Moreover, in certain example embodiments of this invention, the material of the filter(s) may be selected so as to have a total normal emissivity which is less at 650 degrees C. than at 550 degrees C. (aluminosilicate fits this desire in certain embodiments).

In certain embodiments of this invention, ceramic fibers are particularly useful as a material at the ceramic inclusive radiating surface shown in FIG. 10. This is because ceramic fibers tend to emit heating radiation toward the glass substrate to be bent and/or tempered in a diffused manner (as opposed to focused or collimated radiation). In certain example embodiments of this invention, diffusion radiation for heating from a fiber-inclusive surface has been found to be particularly advantageous.

Figure 11:
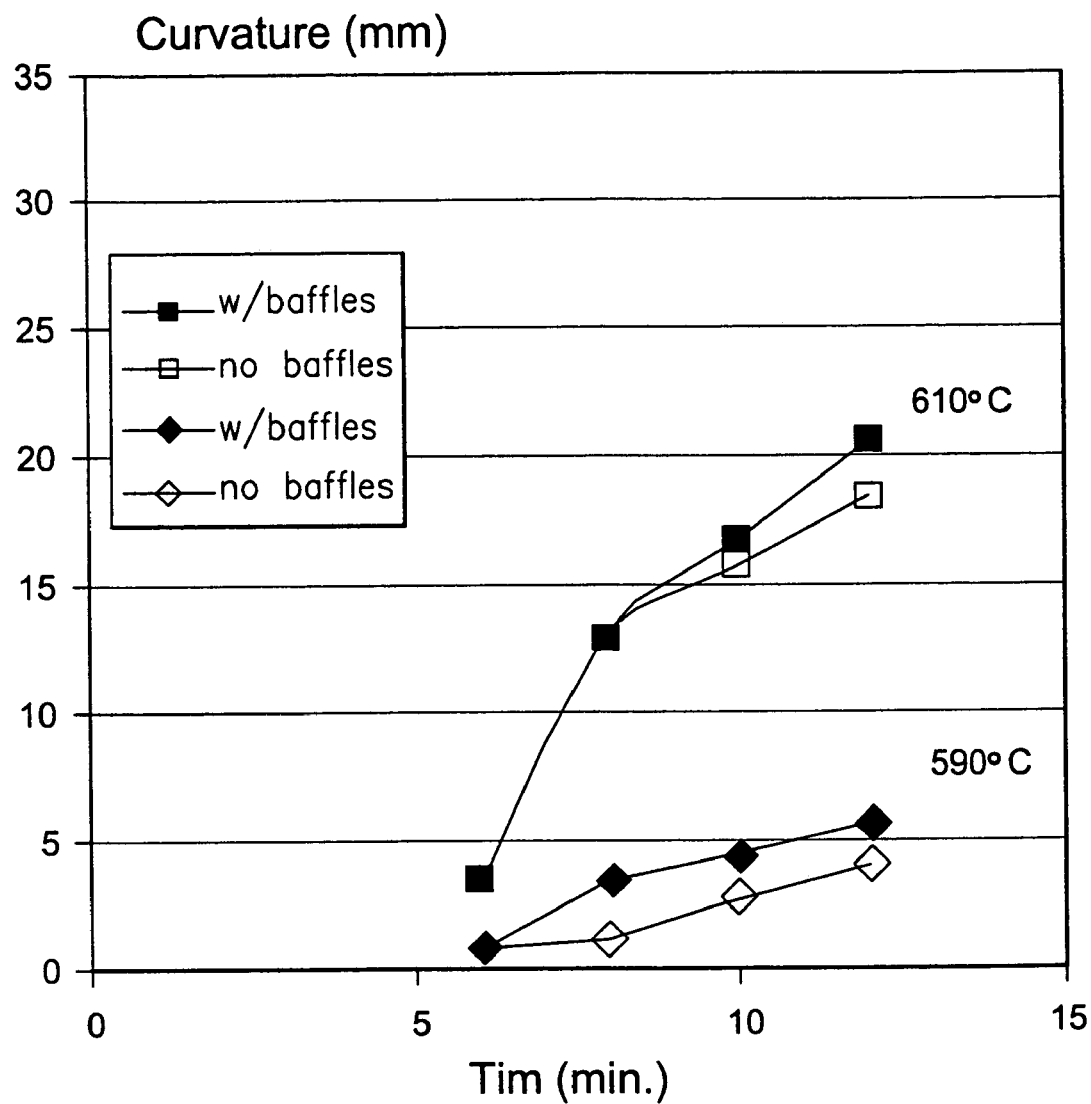
FIG. 11 is a heating time vs. degree of glass substrate bending curvature graph illustrating that the silicate inclusive filters of the FIG. 10 embodiment enable a higher degree of glass bending to be achieved at a given temperature and heating time, compared to if the silicate inclusive filters were not used.
Figure 12:
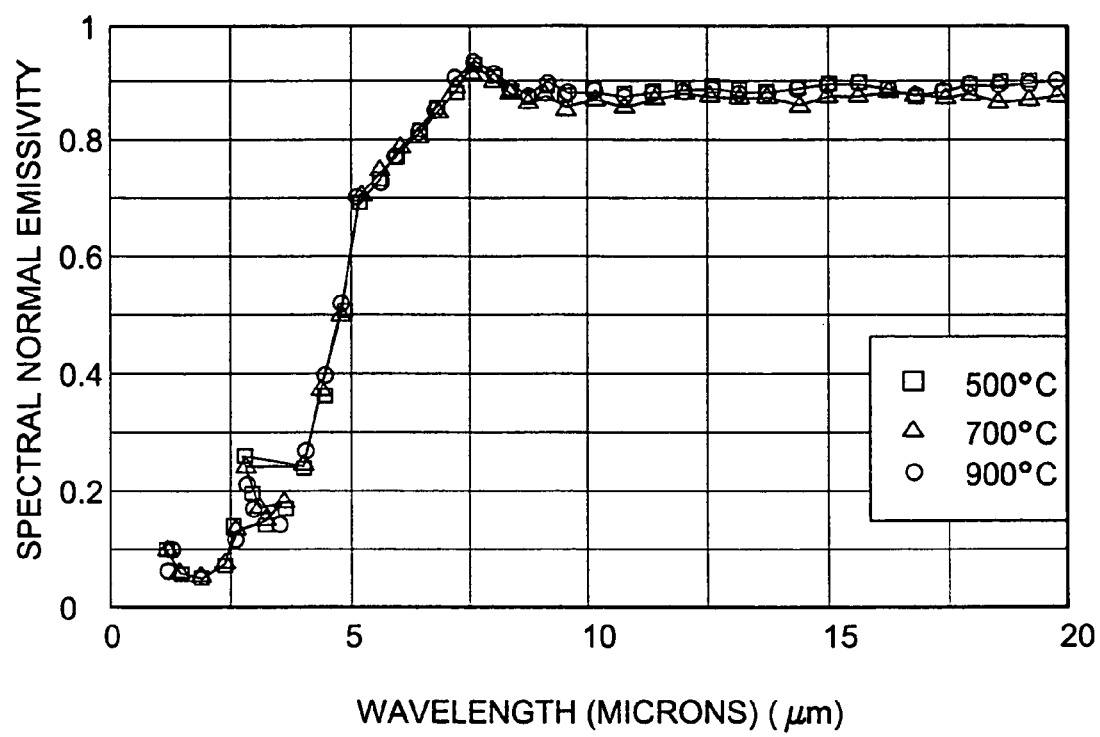
FIG. 12 is an emissivity vs. wavelength graph illustrating the normal emissivity of an aluminosilicate filter in accordance with the FIG. 10–11 embodiment.

FIG. 11 illustrates example advantages of ceramic filter(s) 12 (which may also be used as baffle(s) in certain embodiments) noted in certain examples according to the FIGS. 10 and 12 embodiment of this invention. The FIG. 11 graph was made using aluminosilicate filters 12, although the instant invention is not so limited. It can be seen that at a given temperature (e.g., 590 degrees C.) and heating time, a greater degree of coated substrate bend can be achieved when the filter 12 of FIGS. 10, 12 is used than if it is not used. This is because the emissivity of filter(s) 12 enables the glass to be more efficiently heated, compared to if the filter(s) was not present.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of bending glass, the method comprising:
    providing a glass substrate having a solar control coating thereon;
    providing a heating layer comprising ceramic between the glass substrate and a heating element;
    directing IR radiation at the glass substrate from the heating layer comprising ceramic in order to heat the glass substrate to a temperature of at least about 550 degrees C., thereby causing the glass substrate to bend; and
    wherein less than about 30% of the IR radiation reaching the glass substrate is at wavelengths from 0.7 to 3.0 μm.

2. The method of claim 1, wherein the heating layer is at least part of a near-IR filter.

3. The method of claim 2, wherein the near-IR filter comprises a silicate.

4. The method of claim 3, wherein the near-IR filter comprises aluminosilicate.

5. The method of claim 1, wherein less than about 20% of the IR radiation reaching the glass substrate is at wavelengths from 0.7 to 3.0 μm.

6. The method of claim 1, wherein from about 0–5% of the IR radiation reaching the glass substrate is at wavelengths from 0.7 to 3.0 μm.

7. The method of claim 1, wherein an emitting portion of the heating layer has an emissivity of at least about 0.4 for at least some IR wavelengths in the range of from 5 to 8 μm, and an emissivity of less than 0.45 for all wavelengths from 0.9 to 3 μm.

8. A method of bending and/or tempering a glass substrate, the method comprising:
    supporting at least part of the glass substrate during bending and/or tempering;
    generating heat via at least one heating element; and
    during the bending and/or tempering, at least one near-IR filter filtering out at least some near-IR radiation before it reaches the glass substrate to be bent and/or tempered, the near-IR filter for reducing the amount of near-IR radiation that reaches the glass substrate to be bent and/or tempered during the process of bending and/or tempering the glass substrate.

9. The method of claim 8, wherein the near-IR filter comprises a silicate.

10. The method of claim 8, wherein the near-IR filter comprises aluminosilicate.

11. The method of claim 8, wherein an emitting portion of the near-IR filter has an emissivity of at least about 0.4 at all IR wavelengths from 5 to 8 μm, and an emissivity of less than 0.45 at all wavelengths from 0.9 to 3 μm.

12. The method of claim 8, wherein an emitting portion of the near-IR filter has an emissivity of at least about 0.4 for at least some IR wavelengths in the range of from 5 to 8 μm, and an emissivity of less than 0.45 for all wavelengths from 0.9 to 3 μm.

13. The method of claim 8, wherein the emitting portion of the near-IR filter has an emissivity of at least about 0.7 for at least some IR wavelengths in the range of from 5 to 8 μm, and an emissivity of less than 0.35 for all wavelengths from 0.9 to 3 μm.

* * * * *